US012449513B2

(12) United States Patent
Robertson, Jr. et al.

(10) Patent No.: US 12,449,513 B2
(45) Date of Patent: Oct. 21, 2025

(54) CLEANING AND COOLING OF VEHICLE SENSOR ASSEMBLY

(71) Applicant: Ford Global Technologies, LLC, Dearborn, MI (US)

(72) Inventors: Michael Robertson, Jr., Garden City, MI (US); Venkatesh Krishnan, Canton, MI (US); Rashaun Phinisee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1003 days.

(21) Appl. No.: 17/533,307

(22) Filed: Nov. 23, 2021

(65) Prior Publication Data

US 2023/0161005 A1 May 25, 2023

(51) Int. Cl.
| | | |
|---|---|---|
| B60R 11/02 | (2006.01) | |
| B60R 11/00 | (2006.01) | |
| G01D 11/24 | (2006.01) | |
| G01S 7/481 | (2006.01) | |
| G01S 13/931 | (2020.01) | |
| G01S 17/931 | (2020.01) | |
| G01S 7/497 | (2006.01) | |

(52) U.S. Cl.
CPC ............ *G01S 7/4813* (2013.01); *B60R 11/00* (2013.01); *G01D 11/245* (2013.01); *G01S 13/931* (2013.01); *G01S 17/931* (2020.01); *G01S 2007/4977* (2013.01)

(58) Field of Classification Search
CPC ..... G01S 2007/2977; G01S 2007/4813; G01S 17/931; G01S 17/88; G01S 13/931; G01S 2013/93273; G01S 2007/4977; G01D 11/245; B60R 11/00; B60R 11/2058; B60R 2100/004; B60R 2100/0094
USPC .................................................. 296/210, 37.7
See application file for complete search history.

(56) References Cited

U.S. PATENT DOCUMENTS

| | | | |
|---|---|---|---|
| 10,549,723 B2 * | 2/2020 | Baldovino | ........... G01N 21/958 |
| 10,928,225 B1 | 2/2021 | Krishnan et al. | |
| 11,975,599 B2 * | 5/2024 | Baldovino | .............. G01S 17/42 |
| 2012/0162428 A1 | 6/2012 | Wee | |
| 2019/0250016 A1 * | 8/2019 | Krishnan | ................ B60R 11/00 |
| 2020/0247329 A1 * | 8/2020 | Robertson, Jr. | .......... B60R 11/00 |
| 2021/0025983 A1 * | 1/2021 | Patil | .................... G02B 27/0006 |
| 2021/0063540 A1 | 3/2021 | Krishnan et al. | |
| 2021/0103036 A1 | 4/2021 | Robertson, Jr. et al. | |

FOREIGN PATENT DOCUMENTS

DE 102017221505 A1 6/2019

* cited by examiner

*Primary Examiner* — Dennis H Pedder
(74) *Attorney, Agent, or Firm* — Frank A. MacKenzie; Brooks Kushman P.C.

(57) ABSTRACT

An assembly includes a sensor housing defining an inlet. The assembly includes a sensor assembly rotatably supported by the sensor housing. The sensor assembly includes a sensor and a cover surrounding the sensor. The sensor assembly has a cavity between the sensor and the cover. The inlet is in fluid communication with the cavity.

16 Claims, 6 Drawing Sheets

CLEANING AND COOLING OF VEHICLE SENSOR ASSEMBLY

BACKGROUND

A vehicle may include a system or systems for autonomously or semi-autonomously operating the vehicle, e.g., an advanced driver assist system ADAS for speed control, lane-keeping, rooftop sensor assemblies, etc. In examples where the vehicle includes a rooftop sensor assembly, the rooftop sensor assembly may include sensors that may have a field of view around the vehicle. The rooftop sensor assembly may clean and cool the sensors with fluid and air to ensure integrity of data collected by the sensors such that the vehicle continues to operate properly.

DETAILED DESCRIPTION

An assembly includes a sensor housing defining an inlet. The assembly includes a sensor assembly rotatably supported by the sensor housing. The sensor assembly includes a sensor and a cover surrounding the sensor. The sensor assembly includes a cavity between the sensor and the cover. The inlet is in fluid communication with the cavity.

The sensor housing may define a channel extending from the inlet to the cavity, the inlet being in fluid communication with the cavity through the channel.

The inlet and the channel may define an air flowpath from the inlet to the cavity.

The sensor may be elongated along an axis, at least a portion of the air flowpath extending along the axis.

The sensor housing may define an outlet aimed at the sensor assembly, the inlet being in fluid communication with the outlet.

The sensor housing may define a first channel and a second channel, the first channel extending from the inlet to the cavity and the second channel extending from the inlet to the outlet.

The inlet and the first channel may define a first air flowpath from the inlet to the cavity and the inlet and the second channel define a second air flowpath from the inlet to the outlet.

The second air flowpath may extend adjacent the sensor.

The sensor housing may define a wedge extending upwardly adjacent the outlet and vehicle-forward of the sensor.

The sensor housing may define an air flowpath exterior to the sensor housing along the wedge and adjacent the sensor.

The assembly may include a blower supported by the sensor housing at the inlet.

The cavity may extend continuously circumferentially about the sensor.

The inlet may be vehicle-forward of the sensor.

The sensor housing may be designed to be supported by a vehicle roof.

The inlet may be spaced upwardly from the vehicle roof.

The sensor may be a lidar sensor.

With reference to the Figures, wherein like numerals indicate like parts throughout the several views, an assembly 10 for a vehicle 12 includes a sensor housing 14 defining an inlet 16. The assembly 10 includes a sensor assembly 18 rotatably supported by the sensor housing 14. The sensor assembly 18 includes a sensor 20 and a cover 22 surrounding the sensor 20. The sensor assembly 18 has a cavity 24 between the sensor 20 and the cover 22. The inlet 16 is in fluid communication with the cavity 24.

While the vehicle 12 is in motion, the assembly 10 utilizes the motion of the vehicle 12 and air generated from the vehicle 12 motion to clean and cool the sensor 20. The inlet 16 may receive air from a front of the vehicle 12 as the vehicle 12 is in motion. The air received from the inlet 16 flows through the sensor housing 14 into the cavity 24 between the sensor 20 and the cover 22. The air is used to cool the sensor 20 and to clean the sensor 20, i.e., to remove debris collection (including, for example, water, insects, dirt, etc.) on the sensor 20 during use of the vehicle 12. In some examples, the air is used to prevent debris from reaching the sensor 20, i.e., operating as an air curtain. This air may surround the sensor 20 to cool and clean the sensor 20 while the vehicle 12 is in motion.

Figure 4:
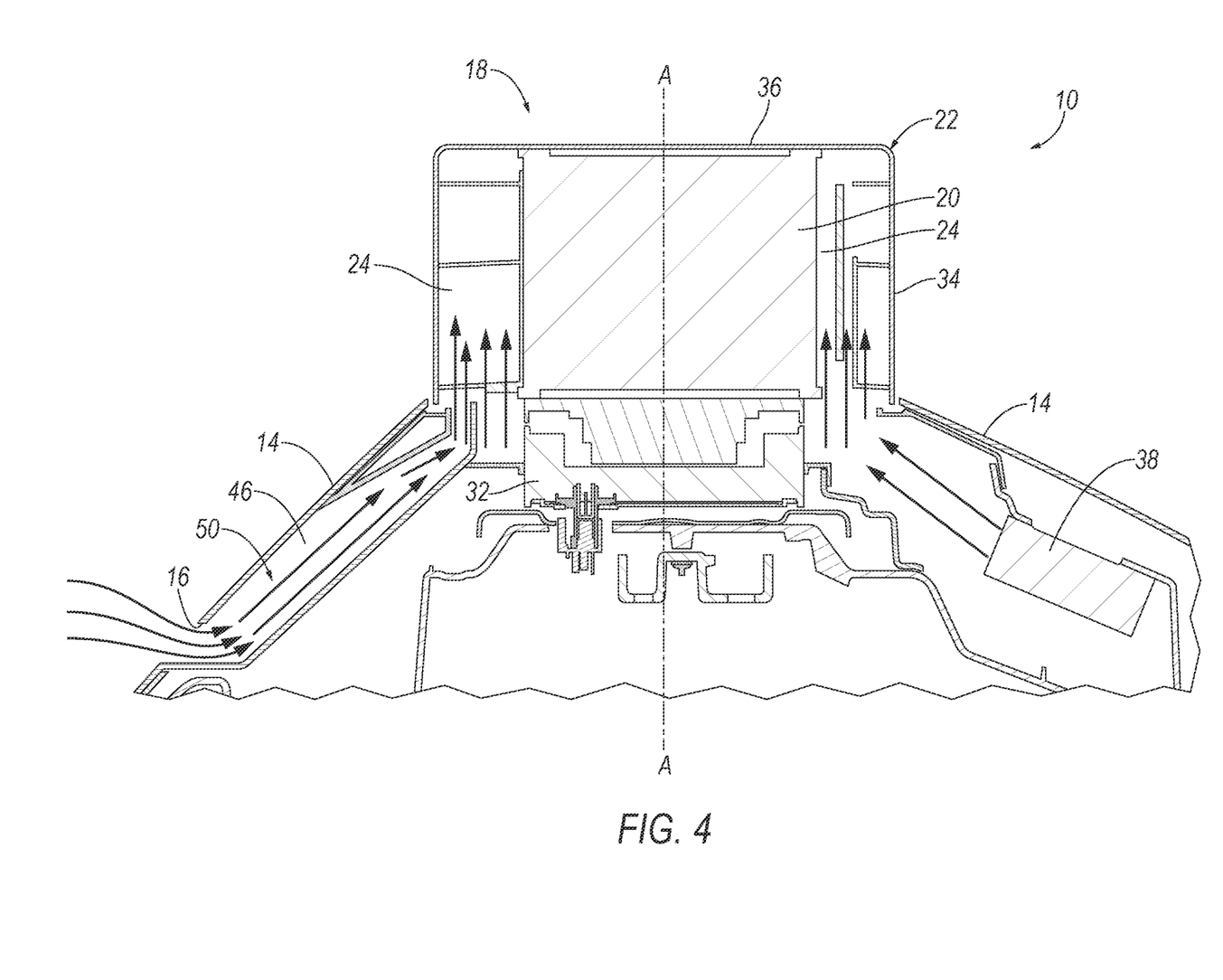
FIG. 4 is a cross-sectional view of a first example embodiment of the assembly through line 4 of FIG. 1.
Figure 5:
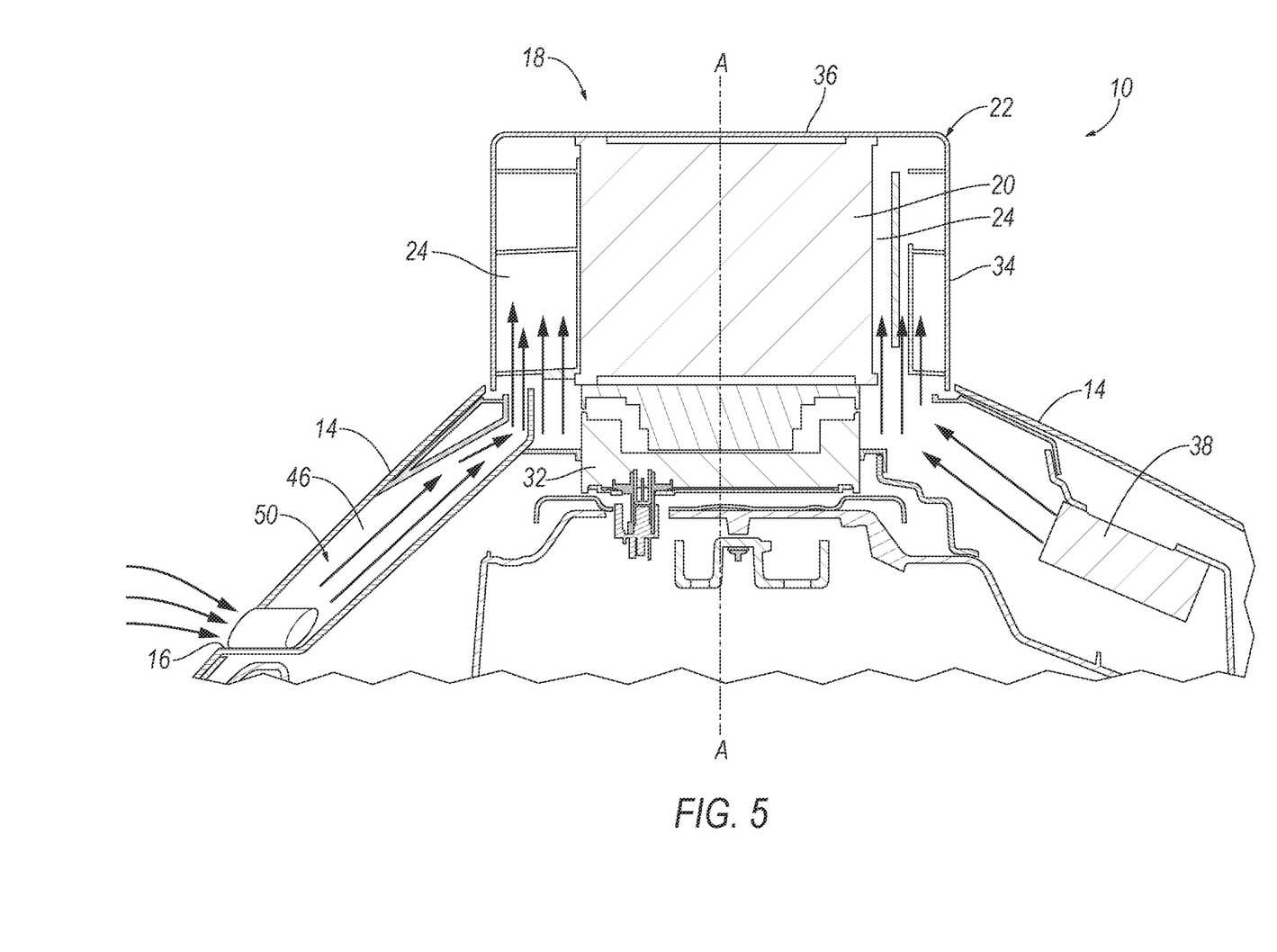
FIG. 5 is a cross-sectional view of a second example embodiment of the assembly through line 4 of FIG. 1.
Figure 6:
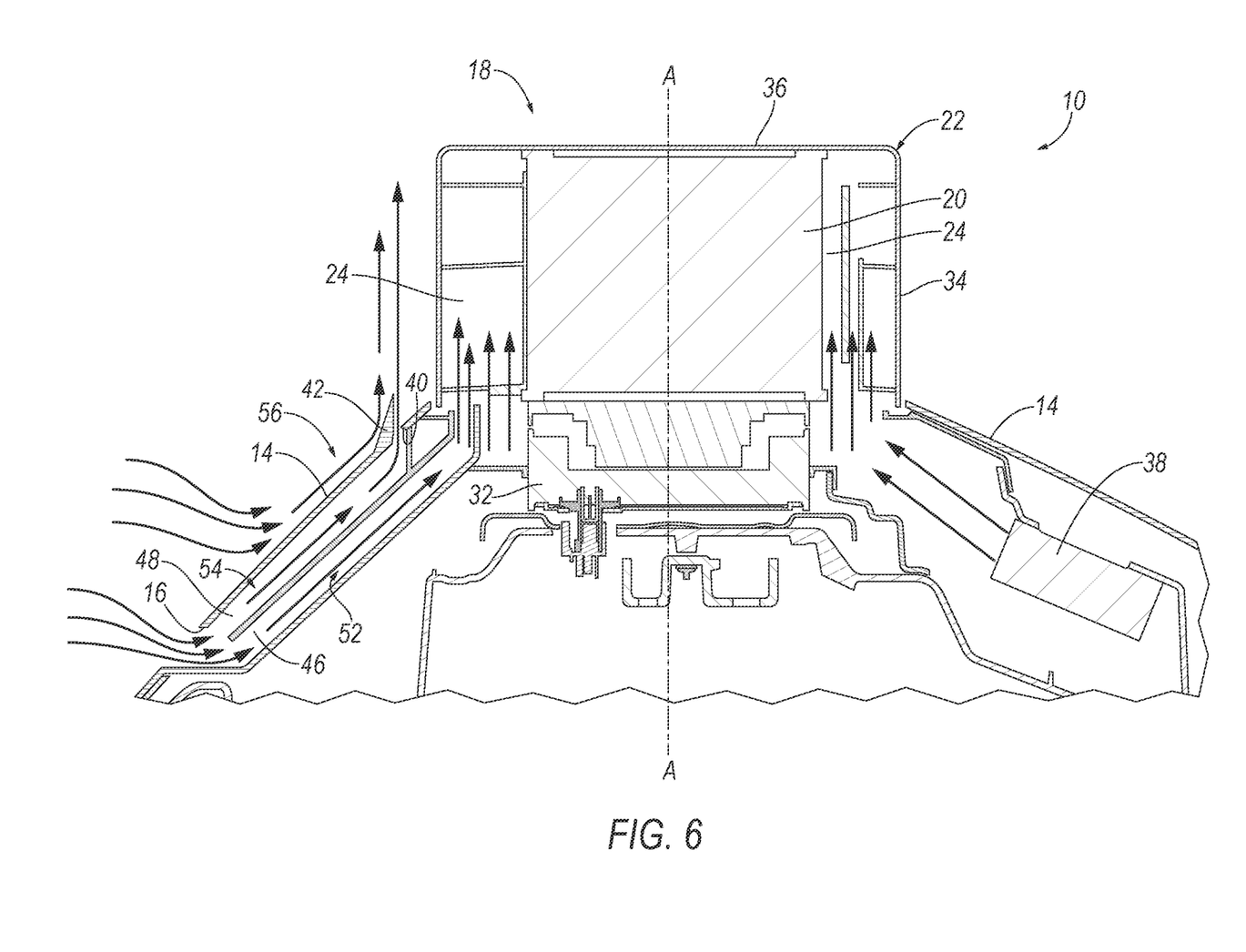
FIG. 6 is a cross-sectional view of a third example embodiment of the assembly through line 4 of FIG. 1.

Three example embodiments are shown in the Figures and common numerals are used to identify common features in the example embodiments. One example embodiment of the assembly 10 is shown in FIG. 4. In such an example, the assembly 10 includes the inlet 16 and a channel 46 directing air from the channel 46 into the cavity 24 of the sensor assembly 18. A second example embodiment of the assembly 10 is shown in FIG. 5. In such an example, the assembly 10 includes a blower 30 at the inlet 16 that supplements the air directed into the cavity 24 through the inlet 16. A third example embodiment of the assembly 10 is shown in FIG. 6. In such an example, the assembly 10 includes a pair of channels 46, 48. One of the channels 46 directs air into the cavity 24 of the sensor assembly 18 and the other of the channels 48 directs air to an outlet 40 that directs air outside of the sensor assembly 18. The outlet 40 may act as an "air curtain" to the sensor assembly 18 for deflecting debris away from the sensor assembly 18.

Figure 1:
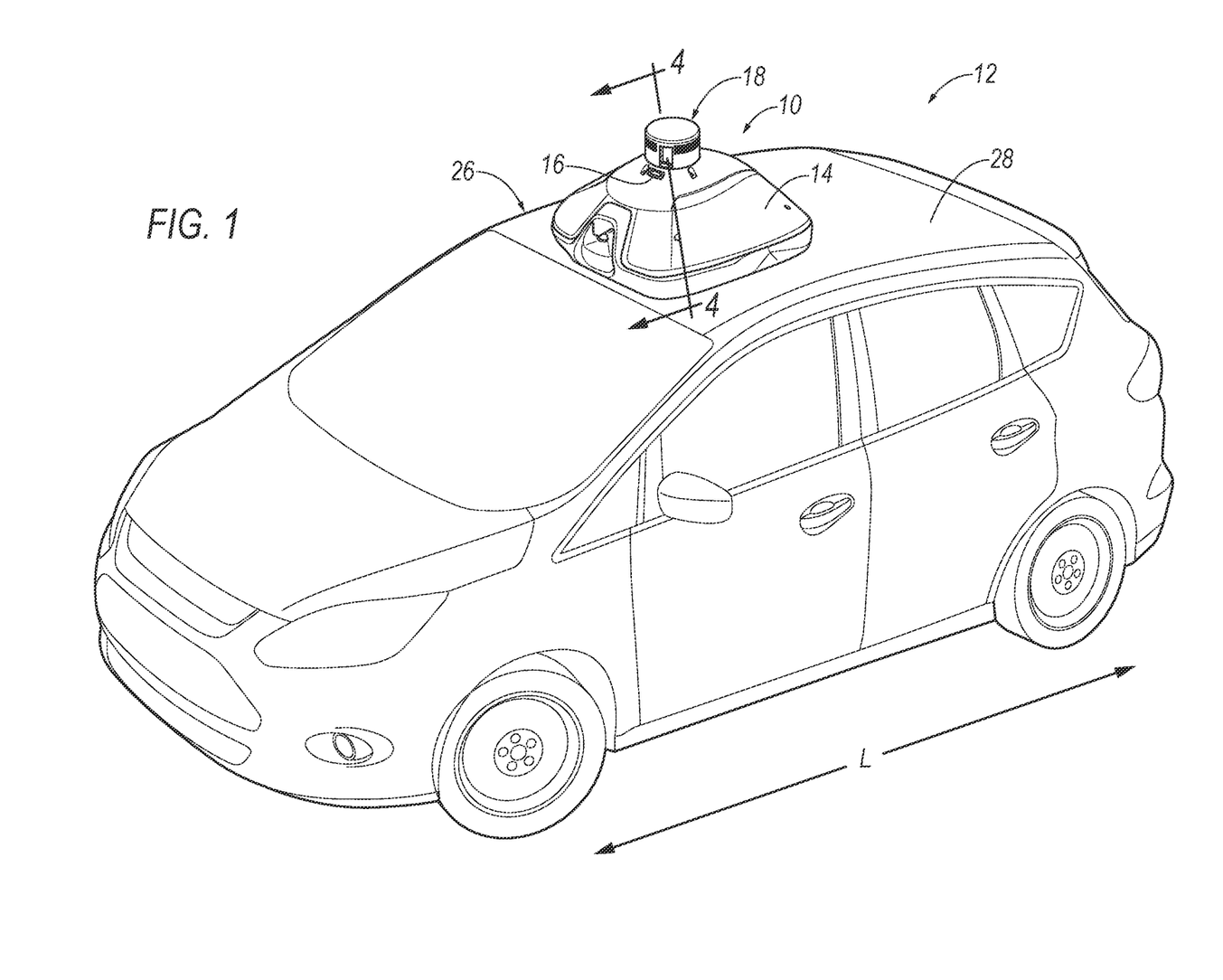
FIG. 1 is a perspective view of a vehicle having an assembly for vehicle sensors supported by a roof of the vehicle.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

In examples where the vehicle 12 is an autonomous vehicle, a computer (not numbered) may be programmed to operate the vehicle 12 independently of the intervention of a human driver, completely or to a lesser degree. The computer may be programmed to operate a propulsion system, brake system, steering, and/or other vehicle systems based at least in part on data received from the sensor 20. For the purposes of this disclosure, autonomous operation means the computer controls the propulsion system, brake system, and steering system without input from a human driver; semi-autonomous operation means the computer controls one or two of the propulsion system, brake system, and steering system and a human driver controls the remainder; and nonautonomous operation means a human driver controls the propulsion system, brake system, and steering system.

The vehicle 12 may include a vehicle body 26. The vehicle body 26 includes body panels at least partially defining an exterior of the vehicle 12. The body panels may present a class-A surface, e.g., a finished surface exposed to view by a customer and free of unaesthetic blemishes and defects. The body panels include, e.g., a vehicle roof 28, body side panels, etc.

The vehicle body 26 defines a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle 12 includes one or more assemblies 10 supported by the vehicle roof 28. For example, the assembly 10 is attached to the vehicle roof 28. The assembly 10 may be supported by the roof to provide the sensor 20 with an unobstructed field of view of an area around the vehicle 12. The assembly 10 includes the sensor housing 14 that may be designed to be supported by the vehicle roof 28. As shown in the Figures, the sensor housing 14 is supported by the vehicle roof 28 above the passenger compartment and on the exterior of the vehicle 12. The assembly 10 may extend upwardly from the vehicle roof 28 and is spaced between a front of the vehicle 12 and a rear of the vehicle 12 along a vehicle-longitudinal axis L. The sensor housing 14 may be secured to the vehicle roof 28 for when the vehicle 12 is in motion. In other words, the sensor housing 14 remains stationary relative to the vehicle roof 28 when the vehicle 12 is in motion. The sensor housing 14 may be secured to the vehicle roof 28 in any suitable way, e.g., fasteners, adhesive, magnets, etc. The sensor housing 14 may present a class-A surface on an exterior of the assembly 10. The sensor housing 14 may enclose and protect operation components of the assembly 10. For example, electrical wiring or other sensors may be housed inside the sensor housing 14. The sensor housing 14 may be formed of, for example, plastic or metal.

Figure 2:
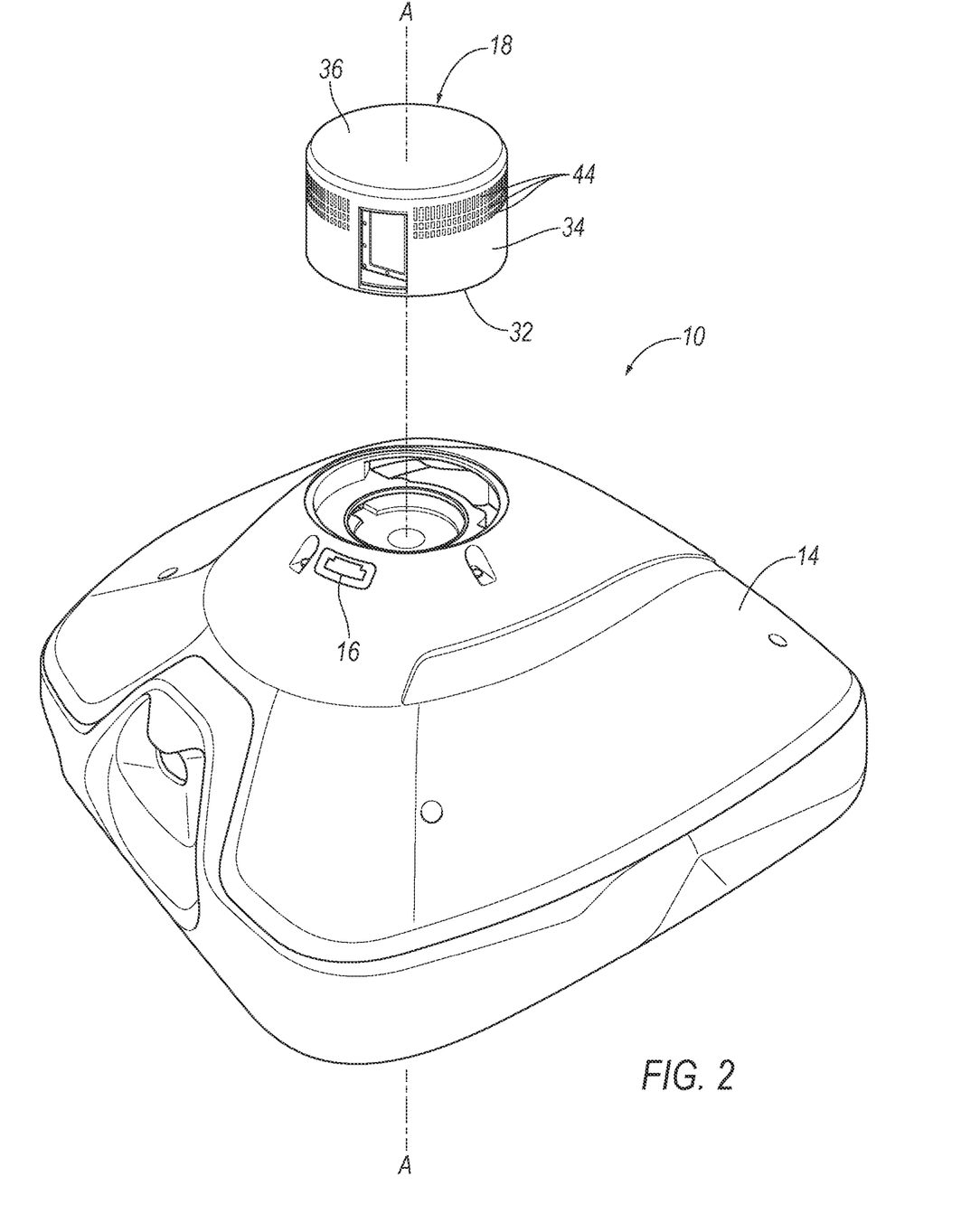
FIG. 2 is an exploded view of the assembly having a sensor assembly and a sensor housing.
Figure 3:
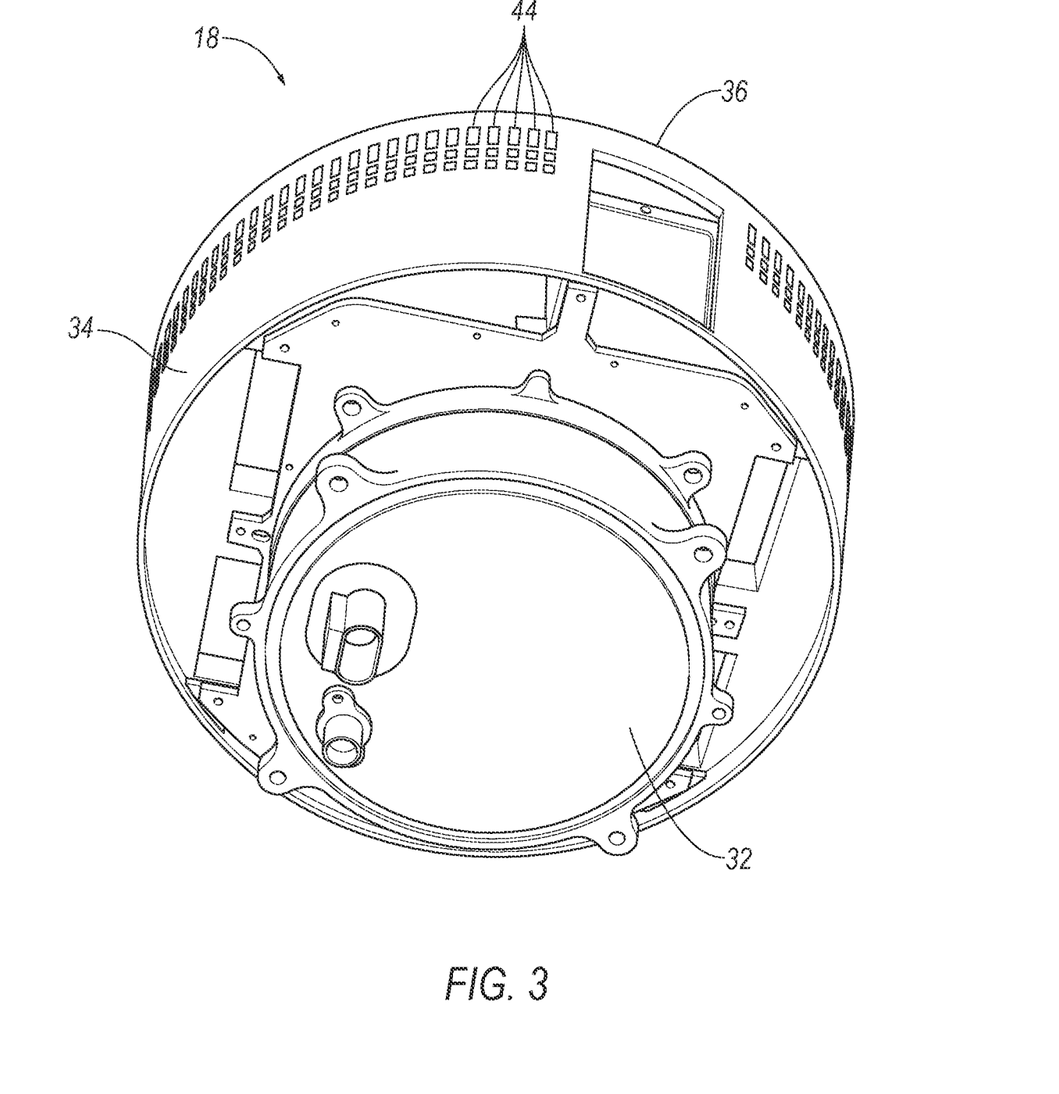
FIG. 3 is a view of a bottom of the sensor assembly.

With reference to FIGS. 1-3, the assembly 10 includes the sensor assembly 18. The sensor assembly 18 may be supported by the sensor housing 14. Specifically, the sensor assembly 18 may extend upwardly from the sensor housing 14. The sensor assembly 18 may be designed to detect features of the outside world. Specifically, the sensor assembly 18 includes the sensor 20 and the sensor 20 detects features of the environment around the vehicle 12. The sensor 20 may be a radar sensor, a scanning laser range finder, a light detection and ranging lidar device (lidar), or an image processing sensor such as a camera. In particular, as shown in the examples in the Figures, the sensor 20 is a lidar sensor, e.g., a scanning lidar sensor. In such an example, the lidar sensor detects distances to objects by emitting laser pulses at a particular wavelength and measuring the time of flight for the pulse to travel to the object and back.

With reference to FIGS. 1-6, the sensor assembly 18 includes the sensor 20 inside the cover 22. The operation of the sensor assembly 18 is performed by the sensor 20 inside the cover 22. The sensor assembly 18 is rotatably supported by the sensor housing 14. The sensor assembly 18 may rotate relative to the sensor housing 14 when the vehicle 12 is in use to detect features of the outside world. In other words, the sensor assembly 18 rotates relative to the vehicle 12. Both the sensor 20 and the cover 22 rotate relative to the vehicle 12 when the vehicle 12 is in use. The sensor 20 has fields of view through sensor windows 44 encompassing a region from which the sensor 20 receives input. As the sensor assembly 18 rotates, the fields of view encompass a horizontal 360 degrees around the vehicle 12.

With reference to FIGS. 2 and 3, the sensor assembly 18 includes a base 32. The base 32 is attached to the sensor housing 14 on a top of the sensor housing 14. The base 32 may be bolted to the housing, e.g., through bolt holes in the base 32. The sensor assembly 18 includes a motor (not shown). The motor is arranged to drivably rotate the sensor assembly 18, i.e., the sensor 20 and the cover 22, in the direction of rotation about an axis A. The motor may be positioned, e.g., inside the base 32. The motor may be, e.g., an electric motor.

As discussed above, the sensor assembly 18 includes the cover 22. In the example shown in the Figures, the cover 22 is cylindrical. Specifically, the cover 22 includes at least one wall 34, e.g., a cylindrical wall 34, and a top panel 36. The top panel 36 extends horizontally to the wall 34. In other examples, the cover 22 may be of any suitable shape. The sensor 20 is contained inside the cover 22. Specifically, the cover 22 surrounds the sensor 20. As discussed above, the cover 22 and the sensor 20 may both rotate relative to the sensor housing 14 when the vehicle 12 is in use. In other words, the sensor 20 and the cover 22 rotate as a unit when the vehicle 12 is in use.

The sensor assembly 18 may be elongated along the axis A. Specifically, in examples where the sensor 20 is a lidar sensor, such as shown in the Figures, the sensor 20 and the cover 22 are elongated along the axis A. In other words, as discussed above, the sensor assembly 18, i.e., the sensor 20 and the cover 22, extend upwardly from the sensor housing 14 along the axis A.

With reference to FIGS. 4-6, the sensor assembly 18 has a cavity 24 between the sensor 20 and the cover 22. The cover 22 may be spaced from the sensor 20 by the cavity 24, i.e., the cavity 24 is between the cover 22 and the sensor 20. The cavity 24 extends continuously circumferentially about the sensor 20. Specifically, the cavity 24 extends continuously circumferentially about the axis A. The term "continuously" in the context of this disclosure means that the cavity 24 is unbroken about the axis A and air may move freely within the cavity 24 and throughout the entire cavity 24. The cavity 24 is elongated along the axis A upwardly from the sensor housing 14. The cavity 24 may fill with air during forward travel of the vehicle 12 to circulate air around the sensor 20 to cool the sensor 20 and clean any debris that may collect on the sensor 20 during use of the vehicle 12.

The sensor assembly 18 may include at least one sensor window 44. The sensor windows 44 are each positioned in the wall 34. The sensor windows 44 may be flat. For example, the sensor windows 44 may have a rectangular shape. The sensor windows 44 are transparent with respect to whatever medium the sensor 20 is capable of detecting. For example, in the example in which the sensor 20 is a lidar sensor, then the sensor windows 44 are transparent with respect to light at the wavelength generated and detectable by the sensor 20.

The sensor housing 14 defines the inlet 16. The inlet 16 may be, for example, an opening in a vehicle-forward side of the sensor housing 14 to receive air from the exterior of the vehicle 12 as the vehicle 12 is in motion. The inlet 16 may be vehicle-forward of the sensor assembly 18. Specifically, the inlet 16 may be vehicle-forward of the sensor 20.

The inlet 16 receives air from the exterior of the vehicle 12 into the sensor housing 14 for cooling and cleaning of the sensor 20. Specifically, the inlet 16 receives air from the exterior of the vehicle 12 as the vehicle 12 is in motion in a forward direction. The inlet 16 may be spaced upwardly from the vehicle roof 28, i.e., a portion of the sensor housing 14 may be between the vehicle roof 28 and the inlet 16. The inlet 16 may be spaced downwardly from the sensor assembly 18, i.e., a portion of the sensor housing 14 may be between the inlet 16 and the sensor assembly 18.

The inlet 16 is in fluid communication with the cavity 24. In other words, air may pass through the inlet 16 and may be directed into the cavity 24 of the sensor assembly 18. Specifically, the sensor housing 14 may define a channel 46 extending from the inlet 16 to the cavity 24. The inlet 16 is in fluid communication with the cavity 24 through the channel 46. In other words, air from the exterior of the vehicle 12, as the vehicle 12 is in motion, may be received by the inlet 16 and be directed by the channel 46 into the cavity 24 of the sensor assembly 18. The air may move within the cavity 24 and around the sensor 20 to cool and clean the sensor 20.

With continued reference to FIGS. 4-6, the assembly 10 may include secondary blowers 38 supported by the sensor housing 14 in various locations within the sensor housing 14. The secondary blowers 38 may take air intake from the exterior of the vehicle 12 to provide further air cleaning and cooling to the sensor assembly 18, i.e., the sensor 20. In other words, the secondary blowers 38 may be in fluid communication with the cavity 24. The secondary blowers 38 may move air inside the sensor housing 14 and into the cavity 24 of the sensor assembly 18 in conjunction with the inlet 16.

The assembly 10 may include any number of additional sensors (not number) designed to detect features of the outside world. The additional sensors may be supported by the sensor housing 14 at various locations around the sensor housing 14. The additional sensor may be a radar sensor, a scanning laser range finder, a light detection and ranging lidar device, or an image processing sensor such as a camera.

With reference to the example embodiment shown in FIG. 4, the inlet 16 and the channel 46 define an air flowpath 50 from the inlet 16 to the cavity 24. The air flowpath 50 extends from the inlet 16, along the channel 46, and into the cavity 24. The air from the exterior of the vehicle 12 moves into the inlet 16, along the channel 46, and into the cavity 24 to define the air flowpath 50. At least a portion of the air flowpath 50 extends along the axis A. In other words, a portion of the air flowpath 50 may extend along the axis A into the cavity 24. The air flowpath 50 may extend generally parallel to the sensor 20 inside the cover 22. As the air flowpath 50 leaves the channel 46, the air flowpath 50 moves upwardly from the sensor housing 14 and into the cavity 24. The air moving along the air flowpath 50 fills the cavity 24 to clean and cool the sensor 20. In other words, the air moves between the cover 22 and the sensor 20 to clean and cool the sensor 20. The air flowpath 50 is indicated in FIG. 4 by arrows extending between the inlet 16 and the cavity 24.

With reference to the example embodiment shown in FIG. 5, the assembly 10 may include a blower 30 supported by the sensor housing 14 at the inlet 16. The blower 30 may supplement the air flowpath 50 into the channel 46 to cool and clean the sensor 20. For example, when the vehicle 12 is not in motion, less air may pass through the inlet 16 and into the cavity 24. In such an example, the blower 30 allows for air to be drawn into the channel 46 and cavity 24 through the inlet 16 despite the vehicle 12 being stationary. In other examples, such as when the vehicle 12 is in motion, the blower 30 supplements the air moving into the inlet 16 to provide additional air into the cavity 24 of the sensor assembly 18. The air flowpath 50 is indicated in FIG. 5 by arrows extending between the inlet 16 and the cavity 24.

With reference to the example embodiment shown in FIG. 6, the assembly 10 includes an outlet 40 in fluid communication with the inlet 16. The sensor housing 14 may define the outlet 40. The outlet 40 may be spaced from the sensor assembly 18 in the vehicle-forward direction. The outlet 40 is aimed at the sensor assembly 18, i.e., the sensor 20. The outlet 40 may act as an "air curtain" to deflect potential debris, e.g., water, insects, dirt, etc., from reaching the sensor assembly 18 as the vehicle 12 is moving. Air received by the inlet 16 may exit the outlet 40 adjacent the sensor assembly 18 to deflect potential debris.

With continued reference to FIG. 6, the sensor assembly 18 may define a pair of channels 46, 48 in fluid communication with the inlet 16, the cavity 24, and/or the outlet 40. For example, the sensor assembly 18 defines the channel 46 extending from the inlet 16 to the cavity 24 and a second channel 48 extending from the inlet 16 to the outlet 40. In such an example, the inlet 16 is in fluid communication with the cavity 24 through the channel 46 and the inlet 16 is in fluid communication with the outlet 40 through the second channel 48. In other words, the inlet 16 is in fluid communication with the cavity 24 and the outlet 40.

With continued reference to FIG. 6, the air received by the inlet 16 may be split between the channel 46 and the second channel 48. For example, a portion of the air may travel along the channel 46 and into the cavity 24 while the remaining air may travel along the second channel 48 and out the outlet 40. Specifically, the inlet 16 and the channel 46 may define a first air flowpath 52 from the inlet 16 to the cavity 24 and the inlet 16 and the second channel 48 may define a second flowpath from the inlet 16 to the outlet 40. Regarding the first air flowpath 52, the inlet 16 receives air from the exterior of the vehicle 12 and the air moves from the inlet 16, along the channel 46, and into the cavity 24 of the sensor assembly 18. Regarding the second air flowpath 54, the inlet 16 receives air from the exterior of the vehicle 12 and the air moves from the inlet 16, along the second channel 48, and out the outlet 40. The second air flowpath 54 may exit the outlet 40 and extend adjacent the sensor 20. As discussed above, the second air flowpath 54 may deflect potential debris from reaching the sensor assembly 18 while the vehicle 12 is in motion, i.e., act as an "air curtain." The first air flowpath 52 and the second air flowpath 54 are indicated in FIG. 6 by arrows extending between the inlet 16 and the cavity 24 and the inlet 16 and the outlet 40.

With continued reference to FIG. 6, the sensor housing 14 defines a wedge 42 extending upwardly adjacent the outlet 40 and vehicle-forward of the sensor 20. The sensor housing 14 may define a third air flowpath 56 exterior to the sensor housing 14 along the wedge 42 and adjacent the sensor 20. The air runs along the exterior of the sensor housing 14 when the vehicle 12 is in motion and is directed upwardly by the wedge 42. Specifically, the wedge 42 directs air, as the vehicle 12 is in motion, upwardly from the sensor housing 14 and vehicle-forward of the sensor assembly 18. The third air flowpath 56 and the second air flowpath 54 may both act together as an "air curtain" vehicle-forward of the sensor assembly 18 to deflect potential debris from reaching the sensor assembly 18. The third air flowpath 56 is indicated in FIG. 6 by arrows extending along the exterior of the sensor housing 14 and upward from the wedge 42.

The adjectives first, second, and third are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
    a sensor housing defining an inlet;
    a sensor assembly rotatably supported by the sensor housing, the sensor assembly including a sensor and a cover surrounding the sensor;
    the sensor assembly having a cavity between the sensor and the cover; and
    the inlet being in fluid communication with the cavity.

2. The assembly of claim 1, wherein the sensor housing defines a channel extending from the inlet to the cavity, the inlet being in fluid communication with the cavity through the channel.

3. The assembly of claim 2, wherein the inlet and the channel define an air flowpath from the inlet to the cavity.

4. The assembly of claim 3, wherein the sensor is elongated along an axis, at least a portion of the air flowpath extends in parallel with the axis.

5. The assembly of claim 1, wherein the sensor housing defines an outlet aimed at the sensor assembly, the inlet being in fluid communication with the outlet.

6. The assembly of claim 5, wherein the sensor housing defines a first channel and a second channel, the first channel extending from the inlet to the cavity and the second channel extending from the inlet to the outlet.

7. The assembly of claim 6, wherein the inlet and the first channel define a first air flowpath from the inlet to the cavity and the inlet and the second channel define a second air flowpath from the inlet to the outlet.

8. The assembly of claim 7, wherein the second air flowpath extends adjacent the sensor.

9. The assembly of claim 5, wherein the sensor housing defines a wedge extending upwardly adjacent the outlet and vehicle-forward of the sensor.

10. The assembly of claim 9, wherein the sensor housing defines an air flowpath exterior to the sensor housing along the wedge and adjacent the sensor.

11. The assembly of claim 1, further comprising a blower supported by the sensor housing at the inlet.

12. The assembly of claim 1, wherein the cavity extends continuously circumferentially about the sensor.

13. The assembly of claim 1, wherein the inlet is vehicle-forward of the sensor.

14. The assembly of claim 1, wherein the sensor housing is designed to be supported by a vehicle roof.

15. The assembly of claim 14, wherein the inlet is spaced upwardly from the vehicle roof.

16. The assembly of claim 1, wherein the sensor is a lidar sensor.

* * * * *